United States Patent [19]

Degress

[11] Patent Number: 5,044,553
[45] Date of Patent: Sep. 3, 1991

[54] SIDEWALL DEFLECTION CONTROL FOR A TWO-DIMENSIONAL NOZZLE

[75] Inventor: Peter B. Degress, Jupiter, Fla.

[73] Assignee: United Technologies Corporation, Hartford, Conn.

[21] Appl. No.: 481,935

[22] Filed: Feb. 20, 1990

[51] Int. Cl.5 .......................... F02K 1/12; B64C 15/02
[52] U.S. Cl. .................................. 239/11; 239/265.19; 239/265.35; 239/265.43; 60/230
[58] Field of Search ................. 239/11, 265.19, 265.33, 239/265.35, 265.37, 265.43; 244/51, 52; 60/230

[56] References Cited

U.S. PATENT DOCUMENTS

| | | | |
|---|---|---|---|
| 3,302,889 | 2/1967 | Sabato | 60/230 |
| 4,005,823 | 2/1977 | Thayer | 239/265.37 |
| 4,037,405 | 7/1977 | Huenniger et al. | 60/230 X |
| 4,641,782 | 2/1987 | Woodward | 239/265.35 X |
| 4,690,329 | 9/1987 | Madden | 60/230 X |
| 4,884,748 | 12/1989 | Ward et al. | 239/265.19 X |
| 4,934,600 | 6/1990 | Nash et al. | 239/265.37 X |

*Primary Examiner*—Andres Kashnikow
*Assistant Examiner*—William Grant
*Attorney, Agent, or Firm*—Christopher T. Hayes

[57] ABSTRACT

A two-dimensional nozzle is disclosed wherein outward deflection of the sidewalls is controlled by using the load force of the divergent actuators to produce a bending moment within each sidewall which opposes such outward deflection.

16 Claims, 2 Drawing Sheets

SIDEWALL DEFLECTION CONTROL FOR A TWO-DIMENSIONAL NOZZLE

The Government has the rights in this invention pursuant to Contract No. F33657-83-C-0092 awarded by the Department of the Air Force.

DESCRIPTION

1. Technical Field

The present invention relates to thrust vectoring nozzles which direct the flow of exhaust gas from a gas turbine engine, and in particular, to a means and a method of controlling sidewall deflection in such nozzles.

2. Background Art

The use of two-dimensional exhaust nozzles on gas turbine engines is well known in the art. Such exhaust nozzles are described in U.S. Pat. Nos. 4,310,121; 4,690,329; and 4,763,840. The nozzles described in each of these patents are characterized as two-dimensional due to the nozzle having a roughly rectangular exhaust flow path defined by two laterally spaced apart sidewalls and two vertically spaced apart divergent flaps. The sidewalls of such nozzles are typically extensions of the nozzle main body and, in conjunction with the divergent flaps, define the flow path of exhaust gas from the engine. Since the pressure of the exhaust gas is substantially higher than the ambient pressure, the exhaust gas tends to deflect the sidewalls outward from the divergent flaps, and as a result, a portion of the exhaust gas escapes between the lateral edges of the divergent flaps and the sidewalls, thereby reducing overall engine efficiency and performance.

To keep sidewall deflection within acceptable limits, the sidewalls of conventional two-dimensional nozzles are structurally reinforced to resist the pressure force of the exhaust gas. However, this structural reinforcement results in an overall increase in the weight of the nozzle, making it a particularly undesirable means of controlling sidewall deflection in those applications where weight is critical, such as on high performance gas turbine powered aircraft.

DISCLOSURE OF INVENTION

It is therefore an object of the present invention to provide means for using the pressure of the exhaust gas on the divergent flaps to counteract sidewall deflection in a two-dimensional exhaust nozzle for a gas turbine engine.

Another object of this invention is to control sidewall deflection in a two-dimensional exhaust nozzle with significantly less structural reinforcement than has been heretofore necessary.

According to the present invention, a two-dimensional convergent-divergent thrust vectoring exhaust nozzle having two laterally spaced apart sidewalls is provided with an upper and a lower divergent flap. These divergent flaps define an upper and a lower gas flow path boundary and provide the means for directing the exhaust gas for achieving thrust vectoring. Orientation of the divergent flaps is achieved by actuators mounted in the sidewalls and connected to cranks on upper and lower fairing flaps, which fairing flaps in turn slideably contact the respective divergent flap near the trailing edge thereof.

During engine operation, pressure force exerted by the exhaust gas on the divergent flaps is transmitted through the fairing flaps and cranks to linear actuators located in the sidewalls. The actuators are mounted within the sidewalls so as to produce a bending moment within the sidewalls which opposes outward deflection thereof. The magnitude of the bending moment is always proportional to the exhaust gas pressure, so that the resistance to outward deflection provided by the bending moment increases as the tendency of the sidewalls to deflect outward increases. Since the present invention uses actuator loading, as opposed to structural reinforcement, to counteract the pressure force exerted by the exhaust gas on the sidewalls, sidewall deflection is controlled with less structural reinforcement than is necessary in conventional two-dimensional nozzles, resulting in a significant reduction in nozzle weight.

The foregoing and other features and advantages of the present invention will become more apparent from the following description and accompanying drawings.

BEST MODE FOR CARRYING OUT THE INVENTION

Figure 1:
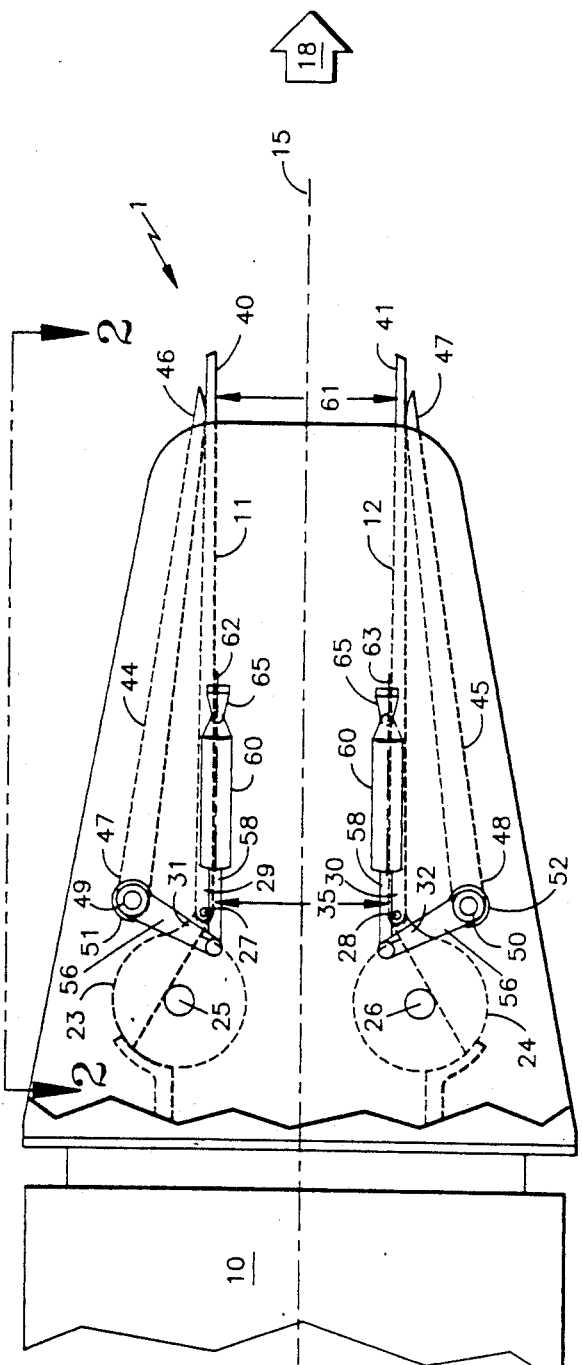
FIG. 1 is a side view partially in section of a nozzle of the present invention.
Figure 2:
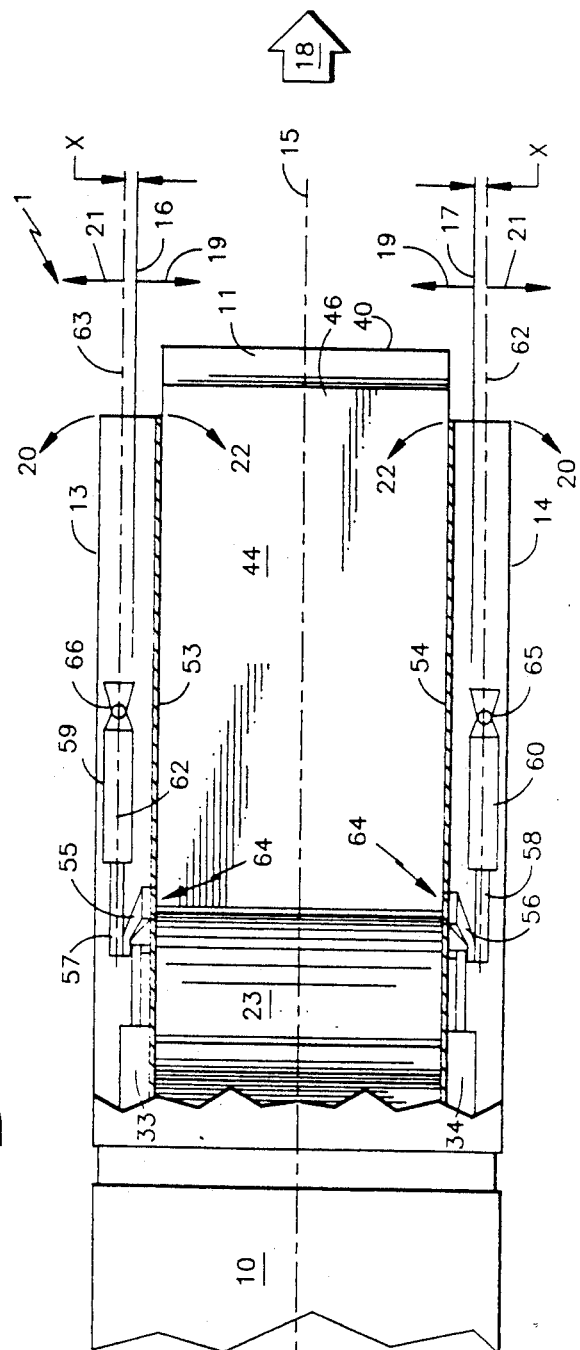
FIG. 2 is a top view of the nozzle of the present invention taken along line 2—2 of FIG. 1.

FIG. 1 shows a cutaway cross sectional schematic view of a typical two-dimensional exhaust nozzle 1 incorporating the present invention. Exhaust gas from a gas turbine engine 10 flows axially aftward bounded by upper and lower divergent flaps 11, 12, and laterally spaced sidewalls 13, 14, as shown in FIG. 2. The flow passage is rectangular in cross-section and is generally symmetrical about horizontal and vertical planes which extend along the centerline 15 of the nozzle 1.

Each of the sidewalls 13, 14 has a neutral plane of zero stress 16, 17 defined therethrough. The neutral plane 16, 17 is characterized in that a force in the aft direction 18 acting on the sidewall at any position inward 19 of that plane produces a bending moment which tends to deflect the sidewall outward 20 from the centerline 15, and such a force acting on the sidewall at any position outward 21 of the neutral plane 16, 17 produces a bending moment which tends to deflect the sidewall inward 22 toward the centerline 15.

Each of the upper and lower nozzle assemblies includes a convergent section 23, 24 forward of the divergent flap 11, 12. The convergent sections 23, 24 extend between the sidewalls 13, 14 and are pivotable about pivot axes 25, 26 which extend transversely across the nozzle 1. A hinge 27, 28 pivotably secures the leading edge 29, 30 of each of the divergent flaps 11, 12 to the trailing edge 31, 32 of the upper or lower convergent section 23, 24 respectively. The convergent sections 23, 24 and the leading edges 29, 30 of the divergent flaps 11, 12 are positioned by the convergent actuators 33, 34 which control the orientation of the convergent sections 23, 24 and the throat area 35.

The exhaust gas flowing through the nozzle exerts an outward pressure force on the divergent flaps 11, 12 thereby maintaining the divergent flaps 11, 12 in contact with the respective fairing flap 44, 45. The forward edge 47, 48 of each fairing flap 44, 45 includes a pivot shaft 49, 50 mounted in the static structure 64 of the nozzle 1. The pivot shaft 49, 50 extends between, and protrudes into, the forward end of each of the sidewalls 13, 14. Each pivot shaft 49, 50 is fixedly secured to the respective fairing flap in a manner that precludes relative movement between the fairing flap 44, 45 and the pivot shaft 49, 50 located therein, so that torque applied to the pivot shaft 49, 50 causes rotation of the fairing flap 44, 45. Near each end of the pivot shaft 49, 50 is a bearing 51, 52 which supports the pivot shaft 49, 50 from, and allows rotation with respect to, each of the inner sidewalls 53, 54. Each end of each pivot shaft 49, 50 has one end of a crank member 55, 56 attached thereto, the other end of each crank member 55, 56 being pivotably attached to the load arm 57, 58 of a divergent flap linear actuator. Each load arm 57, 58 is received within an actuator base 59, 60 having a line of action 62, 63 defined therethrough and which is pivotably secured by brackets 65, 66 to the sidewall in which it is located. Within each sidewall, the base 59, 60 of each actuator is mounted to the sidewall outwardly offset a distance X from the neutral plane 16, 17 so that the actuator base 59, 60 lies substantially aft of that portion of the load arm 57, 58 which extends from the base 59, 60.

During operation of the nozzle 1 according to the present invention, independent positioning of the divergent flaps 11, 12 is controlled by the divergent actuators 59, 60 acting through the fairing flaps 44, 45 which cause the trailing edge 40, 41 of each of the divergent flaps 11, 12 to be positioned according to the desired exit area 61 of the exhaust gas flow and the degree of thrust vectoring desired. When a reduction in exit area 61 is desired, the divergent actuators 59, 60 drive the crank members 55, 56 forward, thereby rotating the fairing flaps 44, 45, driving the aft edge 46, 47 thereof toward the centerline 15. Since each of the divergent flaps 11, 12 contacts one of the fairing flaps 44, 45, movement of the aft edge 46, 47 of the respective fairing flap towards the centerline 15 drives the trailing edge 40, 41 of the respective divergent flap towards the centerline 15 as well.

Under normal engine operating conditions the exhaust gas exerts substantial outward pressure force on the inner surfaces of the sidewalls 53, 54 and the divergent flaps 11, 12. The pressure force exerted on each sidewall 13, 14 tends to deflect the sidewall outward 20 of the centerline 15, a condition which, if left unchecked, would lead to significant losses in engine efficiency and performance. To counteract sidewall deflection, the aftward component of the load force exerted by the divergent flap actuator 59, 60 on the sidewall 13, 14 is used to produce a bending moment in the sidewall 13, 14. Since the mounting position of the divergent actuators 59, 60 is outwardly offset a distance X from the neutral plane of zero stress 16, 17, the bending moment produced tends to deflect the sidewall 13, 14 toward the centerline 15, opposing outward deflection of the sidewall 13, 14.

By adjusting the offset distance X of each base 59, 60 from the neutral plane 16, 17 of the respective sidewall 13, 14, the magnitude of the bending moment can be adjusted to minimize sidewall deflection. Of course, if the offset distance X is excessive, at certain engine operating conditions the sidewall 13, 14 may be deflected inward toward the centerline 15, causing binding of the divergent flaps 11, 12.

Figure 3:
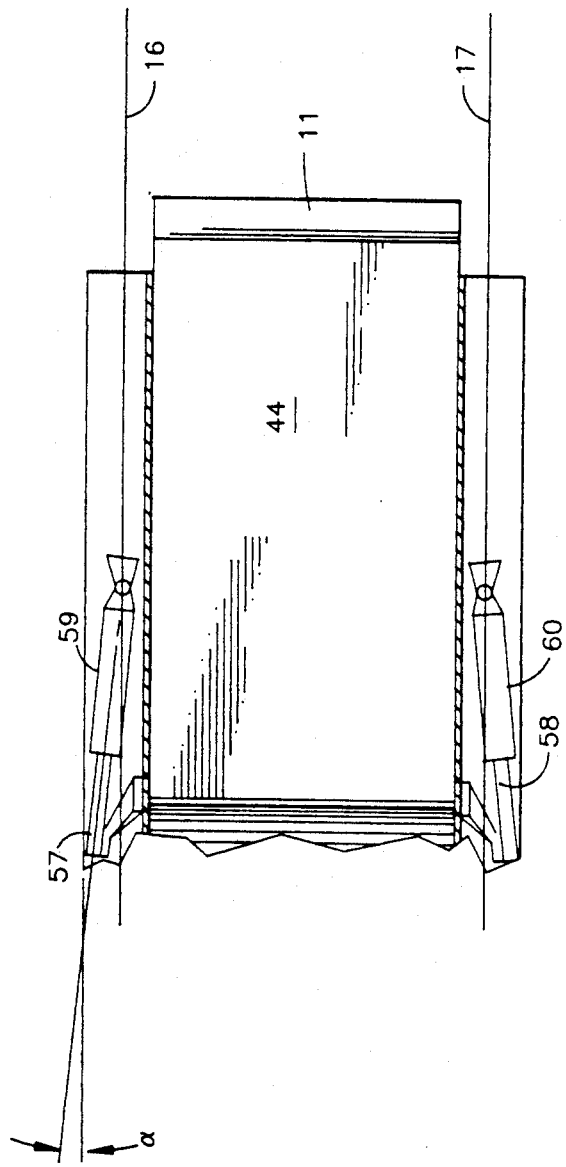
FIG. 3 is a view similar to that shown in FIG. 2 showing a second embodiment of the actuator configuration.
Figure 4:
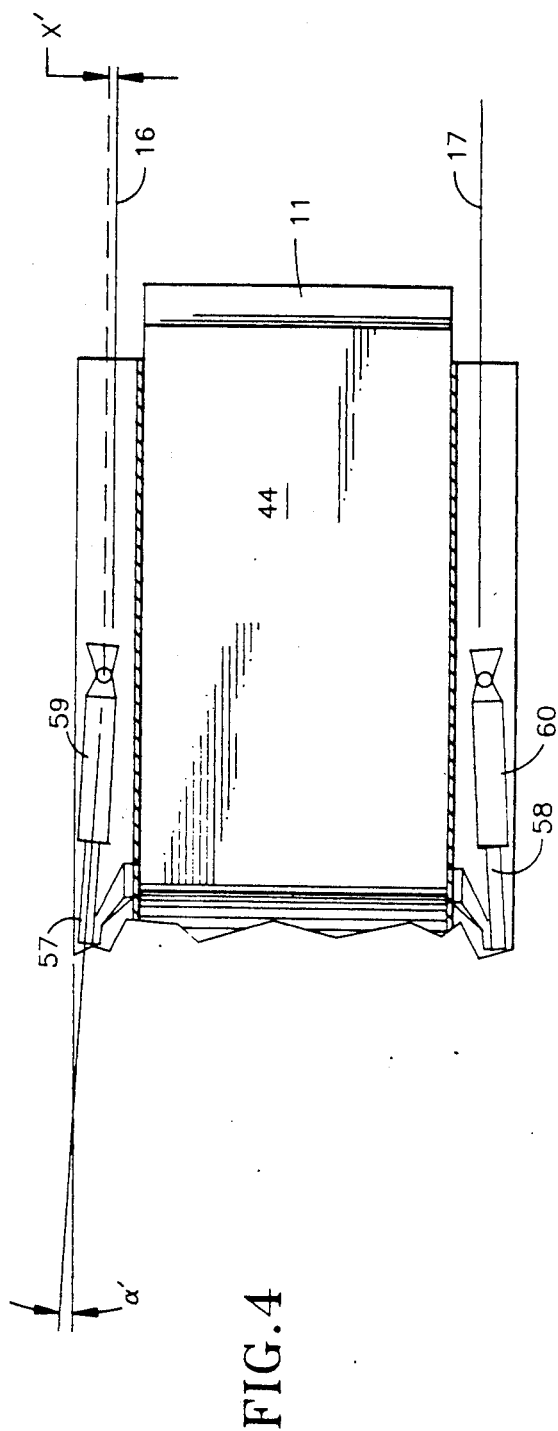
FIG. 4 is a view similar to that shown in FIG. 2 showing a third embodiment of the actuator configuration.

Although in the preferred embodiment the base 59, 60 of each divergent actuator is described as being offset a distance X from the neutral plane 16, 17 and the aftward component of the actuator load force is used to produce the desired bending moment, those skilled in the art will appreciate that the line of action 62, 63 of each actuator can be positioned at an acute angle a to the neutral plane 16, 17, as shown in FIG. 3, so that the lateral component of the divergent actuator load force produces the desired bending moment. As a further option, the base 59, 60 of each divergent actuator can be mounted offset a distance X' from, and at an acute angle a' to, the neutral plane 16, 17, as shown in FIG. 4, so that the desired bending moment is the sum of the bending moment produced by the aftward component of the load force and the bending moment produced by the lateral component of the load force.

The present invention uses the pressure force exerted by the exhaust gas on the divergent flaps 11, 12 to produce the bending moment in each sidewall 13, 14. Therefore, during engine operation the magnitude of the bending moment increases proportionally with the pressure force exerted by the exhaust gas on the inner sidewalls 53, 54. As a result, in the sidewall deflection control of the present invention the magnitude of the bending moment reaches its maximum when the outward pressure force on the sidewall 16, 17 reaches its maximum. It should be apparent without extensive discussion that since the bending moment provides some of the resistance to sidewall deflection that is normally achieved with structural reinforcement, the sidewalls 13, 14 of a nozzle which incorporates the present invention require less structural reinforcement than those nozzles in the prior art, permitting a lighter weight nozzle design.

Although this invention has been shown and described with respect to detailed embodiments thereof, it will be understood by those skilled in the art that various changes in form and detail thereof may be made without departing from the spirit and scope of the claimed invention.

We claim:

1. A sidewall deflection controlled two-dimensional nozzle in which exhaust gas from a gas turbine engine enters the nozzle through a forward end of the nozzle and exits through an aft end of the nozzle, said nozzle comprising:

a static structure having a centerline defined therethrough and first and second sidewalls laterally spaced from said centerline; and upper and lower movable flap assemblies, each flap assembly extending between the first and second sidewalls and including a divergent flap extending between the first and second sidewalls and having a leading edge and a trailing edge, and, positioning means for selectively positioning the trailing edge of the divergent flap, said positioning means including actuator means mounted to the respective sidewall at a mounting position which is aft of the leading edge, thereby counteracting sidewall deflection caused by said exhaust gas a positioning member slideably contacting the divergent flap for positioning thereof, said positioning member fixedly secured to a pivot shaft mounted in the static structure of the nozzle;

rotating means for rotating said positioning member, said rotating means attached to said pivot shaft; and, each actuator means including a load arm connected to the corresponding rotating means.

2. The nozzle of claim 1 wherein each of said first and second sidewalls has a neutral plane of zero stress defined therethrough, each mounting position offset from the neutral plane of zero stress of the respective sidewall producing a bending moment when the actuator means exerts a load force on the respective sidewall, said bending moment tending to deflect the respective sidewall.

3. The nozzle of claim 2 wherein said positioning member comprises a fairing flap, and said rotating means comprise crank members attached to each end of said pivot shaft.

4. The nozzle of claim 2 wherein said bending moment tends to deflect the respective sidewall toward said centerline.

5. The nozzle of claim 1 wherein each of said first and second sidewalls has a neutral plane of zero stress defined therethrough, each actuator means has a line of action defined therethrough, said line of action aligned at an acute angle to the neutral plane of zero stress of the respective sidewall to produce a bending moment when the actuator means exerts a load force on the respective sidewall, said bending moment tending to deflect the respective sidewall.

6. The nozzle of claim 5 wherein said positioning member comprises a fairing flap, and said rotating means comprise crank members attached to each end of said pivot shaft.

7. The nozzle of claim 5 wherein said bending moment tends to deflect the respective sidewall toward said centerline.

8. In a two-dimensional exhaust nozzle for a gas turbine engine, in which the engine exhaust gas enters the nozzle through a forward end of the nozzle and the exhaust gas exits the nozzle through an aft end of the nozzle, said nozzle having a centerline defined therethrough, said nozzle having first and second sidewalls laterally spaced from said centerline, and upper and lower movable flap assemblies, each flap assembly including a divergent flap extending between the first and second sidewalls and having a leading edge and a trailing edge, and positioning means connected to said divergent flap for selectively positioning the trailing edge of the divergent flap, wherein during operation of the engine, pressure force exerted by the exhaust gas on the sidewalls tends to deflect the sidewalls outward from said centerline, the improvement characterized in that:

said positioning means includes actuators for actuating said divergent flap and opposing said pressure force exerted by the exhaust gas on the sidewalls, each actuator secured to one of said sidewalls at a mounting position which is aft of the leading edge.

9. The nozzle of claim 8 wherein the improvement further comprises each actuator including a load arm, and said mounting position is aft of the load arm.

10. The nozzle of claim 8 wherein the improvement further comprises each of said first and second sidewalls including a neutral plane of zero stress defined therethrough, and each mounting position is offset from the neutral plane of zero stress of the respective sidewall to produce a bending moment when the actuator exerts a load force on the respective sidewall, said bending moment tending to deflect the respective sidewall toward said centerline.

11. The nozzle of claim 8 wherein the improvement further comprises each of said first and second sidewalls including a neutral plane of zero stress defined therethrough, each actuator has a line of action defined therethrough, said line of action is aligned at an acute angle to the neutral plane of zero stress of the respective sidewall, to produce a bending moment when the actuator exerts a load force on the respective sidewall, said bending moment tending to deflect the respective sidewall toward said centerline.

12. The nozzle of claim 8 wherein the improvement further comprises each of said first and second sidewalls including a neutral plane of zero stress defined therethrough, each mounting position is offset from the neutral plane of zero stress of the respective sidewall to produce a first bending moment when the actuator exerts a load force on the respective sidewall, each actuator has a line of action defined therethrough, said line of action is aligned at an acute angle to the neutral plane of zero stress of the respective sidewall to produce a second bending moment when the actuator exerts a load force on the respective sidewall, said first and second bending moments tending to deflect the respective sidewall toward said centerline.

13. A method of reducing sidewall deflection in a two-dimensional nozzle for a gas turbine engine in which exhaust gas from said engine exerts a pressure force upon a first sidewall and a second sidewall, thereby causing deflection of the sidewalls outward from the exhaust gas, said method comprising:

providing upper and lower movable flap assemblies, each flap assembly extending between the first and second sidewalls and including a divergent flap against which said exhaust gas exerts pressure force, and positioning means for selectively positioning said flap, said positioning means contacting said flap and including first and second actuators mounted to the first and second sidewalls, respectively;

transmitting the exhaust gas pressure force on each of the flaps through the positioning means to provide a load force on the first and second sidewalls; and, utilizing said load force to produce a bending moment in the respective sidewall which tends to counteract the deflection.

14. The method of claim 13 wherein each of said sidewalls includes a neutral plane of zero stress, and at least part of said bending moment is produced by transmitting said load force to the sidewalls through mounting positions offset from said neutral plane of zero stress.

15. The method of claim 13 wherein each of said sidewalls includes a neutral plane of zero stress, and at least part of said bending moment is produced by transmitting each said load force to the respective sidewall at an acute angle to said neutral plane of zero stress.

16. The method of claim 13 wherein each of said sidewalls includes a neutral plane of zero stress, and said bending moment is produced by transmitting each said load force to the respective sidewall at an acute angle to said neutral plane of zero stress through a mounting position which is offset from said neutral plane of zero stress.

* * * * *

UNITED STATES PATENT AND TRADEMARK OFFICE
CERTIFICATE OF CORRECTION

PATENT NO. : 5,044,553

DATED : September 3, 1991

INVENTOR(S) : Peter B. DeGress

It is certified that error appears in the above-identified patent and that said Letters Patent is hereby corrected as shown below:

Column 4, line 9, "a" should read -- $\alpha$ --
Column 4, line 15, "a'" should read -- $\alpha'$ --

Signed and Sealed this

Second Day of February, 1993

Attest:

STEPHEN G. KUNIN

*Attesting Officer*      Acting Commissioner of Patents and Trademarks